US008218503B2

(12) United States Patent
Terry et al.

(10) Patent No.: US 8,218,503 B2
(45) Date of Patent: Jul. 10, 2012

(54) CALL SETUP PROCEDURE IN AN EVOLVED THIRD GENERATION RADIO ACCESS NETWORK

(75) Inventors: Stephen E. Terry, Northport, NY (US); Maged M. Zaki, Pierrefonds, CA (US); Rajat P. Mukherjee, Montreal (CA)

(73) Assignee: InterDigital Technology Corporation, Wilmington, DE (US)

(*) Notice: Subject to any disclaimer, the term of this patent is extended or adjusted under 35 U.S.C. 154(b) by 416 days.

(21) Appl. No.: 12/491,676

(22) Filed: Jun. 25, 2009

(65) Prior Publication Data

US 2009/0258646 A1    Oct. 15, 2009

Related U.S. Application Data

(62) Division of application No. 11/553,875, filed on Oct. 27, 2006, now abandoned.

(60) Provisional application No. 60/731,097, filed on Oct. 28, 2005.

(51) Int. Cl.
*H04W 4/00* (2009.01)
(52) U.S. Cl. .................................. 370/331; 455/509
(58) Field of Classification Search .......... 370/328–329, 370/331, 335, 338; 455/403, 410–411, 435, 455/445, 509, 517
See application file for complete search history.

(56) References Cited

U.S. PATENT DOCUMENTS

| 7,457,265 | B2* | 11/2008 | Julka et al. .................. 370/331 |
| 7,668,541 | B2* | 2/2010 | O'Neill et al. ............. 455/432.1 |
| 7,738,464 | B2* | 6/2010 | Lee et al. .................. 370/395.21 |
| 2002/0003789 | A1* | 1/2002 | Kim et al. ................... 370/338 |
| 2002/0176382 | A1* | 11/2002 | Madour et al. .............. 370/331 |
| 2004/0019539 | A1* | 1/2004 | Raman et al. ................. 705/29 |
| 2004/0114574 | A1 | 6/2004 | Zeira et al. |
| 2004/0148352 | A1 | 7/2004 | Menon et al. |
| 2004/0242238 | A1* | 12/2004 | Wang et al. ................ 455/456.1 |
| 2005/0026607 | A1 | 2/2005 | Hwang et al. |
| 2005/0250474 | A1 | 11/2005 | Hong et al. |
| 2005/0266846 | A1 | 12/2005 | Kim |
| 2006/0171541 | A1 | 8/2006 | Horn et al. |
| 2008/0247337 | A1 | 10/2008 | Li et al. |

OTHER PUBLICATIONS

"3G Network Architecture Model" originally from http://www.linuxdevices.com/files/misc/nec_1001-02.jpg.

(Continued)

*Primary Examiner* — Chi H. Pham
*Assistant Examiner* — Kevin Mew
(74) *Attorney, Agent, or Firm* — Volpe and Koenig, P.C.

(57) ABSTRACT

A method and system for call setup in an evolved third generation (3G) radio access network are disclosed. A wireless transmit/receive unit (WTRU) sends its identity to a core network (CN) for call setup when the WTRU is in an RRC_disconnected state. The CN verifies the identity and sends an authentication vector to the WTRU. The WTRU sends a service access request message including an authentication response to the CN via a Node-B. The Node-B performs an admission control. The CN attaches the WTRU if the authentication response is same to an expected response. The Node-B then allocates radio resources to the WTRU. The Node-Bs may be directly connected, or may be connected to a control plane server which performs admission control. When the WTRU is transitioning from an RRC_idle state to an RRC_connected state, the WTRU may or may not need to re-authenticate again.

23 Claims, 6 Drawing Sheets

OTHER PUBLICATIONS

"UMTS Mobile Originated Call—Basic Mobile Originating Call Diagram," from http://web.archive.org/web/20050626100218/http://www.umtsworld.com/technology/moc.htm.

3GPP Support Team, "*Current Minutes of the 48bis TSG-RANWG2 meeting*", (Cannes, Oct. 2005).

3GPP, "*Universal Mobile Telecommunications System (UMTS) Radio Resource Control (RRC) Protocol Specification (Release 6)*" 3GPP TS 25.331 version 6.13.0.

Ericsson, "*EUTRAN Delay Budget Comparison*," SRJ-050049, RAN WG3—TSG SA WG2 Joint Meeting, (Montreal, Jun. 28-30, 2005).

Nokia, "*Technologies for UTRAN long term evolution*", 3GPP RAN Future Evolution Workshop, (Toronto, Nov. 2004).

Nortel Networks, "*LTE: RAN WG2 Summary*" R2-051759 by Nortel Networks.

NTT DoCoMo, "*Proposed signaling flow from camp-on to active state*", 3GPP TSG-RAN2 Meeting, (London, Aug. 29-Sep. 2, 2005).

Vodafone, "*Requirements for long-term RAN Evolution*", 3GPP RAN Future Evolution Workshop, (Toronto, Nov. 2004).

\* cited by examiner

CALL SETUP PROCEDURE IN AN EVOLVED THIRD GENERATION RADIO ACCESS NETWORK

CROSS REFERENCE TO RELATED APPLICATION

This application is a divisional of U.S. application Ser. No. 11/553,875, filed Oct. 27, 2006 which claims the benefit of U.S. Provisional Application No. 60/731,097 filed Oct. 28, 2005, which is incorporated by reference as if fully set forth.

FIELD OF INVENTION

The present invention is related to wireless communication systems. More particularly, the present invention is related to a method and system for call setup in an evolved third generation (3G) radio access network (RAN).

BACKGROUND

The 3G standards group is currently considering various proposals for the long term evolution (LTE) of the 3G RAN. The LTE has been driven by the needs for reducing cost, improving spectral efficiency, facilitating support for revenue increasing services, improving operation and maintenance (O&M) and service provisioning, increasing throughput, reducing end-to-end delay during call setup, having seamless mobility, or the like.

FIG. 1 illustrates conventional 3G network 100. The conventional 3G network 100 includes an RAN 110, (comprising a plurality of Node-Bs 112 and a radio network controller (RNC) 114), and a core network (CN) 120. The CN 120 includes a packet switched domain 122 and a circuit switched domain 132. The packet switched domain 122 includes a serving GPRS support node (SGSN) 124 and a gateway GPRS support node (GGSN) 126. The circuit switched domain 132 includes a mobile switching center (MSC) 134 and a gateway MSC (GMSC) 136. The CN 120 also includes an IP multimedia subsystem (IMS) 128.

The 3G standards currently specify that layer 2 (i.e., medium access control (MAC) layer) functionalities be split between the Node-B 112 and the RNC 114. The Node-B 112 performs radio resource management (RRM) for implementing high speed downlink packet access (HSDPA) and high speed uplink packet access (HSUPA). Layer 3 functionality (i.e., radio resource control (RRC)) resides in the RNC 114. It has been proposed that to reduce end-user latency, user and control plane separation in the RAN 110 should be implemented so that optimized routing of user-plane and control-plane data may be achieved. Furthermore, many RRC functionalities currently implemented by the RNC 114 may be moved to the Node-B 112 for enabling faster communication. This would remove multiple signaling and should help in reducing latency. It has also been proposed that latency in the RAN 110 is not affected by moving the RRC functionalities into the Node-B 112 (or alternatively removing the RNC 114 completely).

FIG. 2 is a signaling diagram of a conventional call setup procedure 200. The RAN 110 broadcasts system information via a broadcast channel (BCH) (step 202). A wireless transmit/receive unit (WTRU) 101 receives the system information while the WTRU 101 is in an idle state. The call setup is performed by the steps of establishing an RRC connection, establishing an RRC signaling connection and establishing a radio bearer. The RRC layer of the WTRU 101 leaves an idle state and sends an RRC connection request to the RAN to establish the RRC connection (step 204). Upon reception of the RRC connection request, the RRC layer of the RAN 110 selects radio resource parameters and sends an RRC connection setup message including the radio resource parameters to the WTRU 101 (step 206). Upon reception of the RRC connection setup message, the RRC layer of the WTRU 101 configures physical and MAC layers based on the radio resource parameters to establish the RRC connection. Upon establishment of a local radio link control (RLC) signaling link, the WTRU 101 sends an RRC connection complete message to the RAN 110 (step 208).

In order to establish an RRC signaling connection, a non-access stratum (NAS) of the WTRU 101 sends an initial direct transfer message to the RRC layer of the RAN 110 (step 210). The initial direct transfer may be a connection management (CM) service request (step 212), which is acknowledged by a CM service accept message (step 214).

In order to establish a radio bearer, the RRC layer of the RAN 110 sends a radio bearer setup message to the RRC layer of the WTRU 101 (step 216). The radio bearer setup message includes physical layer, MAC layer and RLC layer parameters. After receiving the radio bearer setup message, the WTRU 101 configures physical layer and MAC layers, and sends a radio bearer setup complete message to the RRC layer of the RAN 110 (step 218).

One of the problems of the conventional call setup procedure is a multi-layer call setup procedure that occurs in the RAN 110. This is primarily due to legacy complications as well as the separation imposed between the MAC and the RRC layers, with the MAC layer in the Node-B 112 and the RRC layer in the RNC 114. Therefore, it would be desirable to provide a simplified call setup procedure in the RAN 110.

SUMMARY

The present invention is related to a method and system for call setup in a wireless communication system, for example an evolved 3G RAN. A WTRU sends its identity to a CN for call setup when the WTRU is in an RRC_disconnected state. The CN verifies the identity and sends an authentication vector to the WTRU. The WTRU sends a service access request message including an authentication response to the CN via a Node-B. The Node-B performs an admission control. The CN attaches the WTRU if the authentication response is same to an expected response. The Node-B then allocates radio resources to the WTRU. The Node-Bs may be directly connected, or may be connected to a control plane server which performs admission control.

DETAILED DESCRIPTION OF THE PREFERRED EMBODIMENTS

Hereafter, the terminology "WTRU" includes but is not limited to a user equipment (UE), a mobile station (STA), a fixed or mobile subscriber unit, a pager, or any other type of device capable of operating in a wireless environment. When referred to hereafter, the terminology "Node-B" includes but is not limited to a base station, a site controller, an access point (AP) or any other type of interfacing device in a wireless environment.

The features of the present invention may be incorporated into an integrated circuit (IC) or be configured in a circuit comprising a multitude of interconnecting components.

Figure 1:
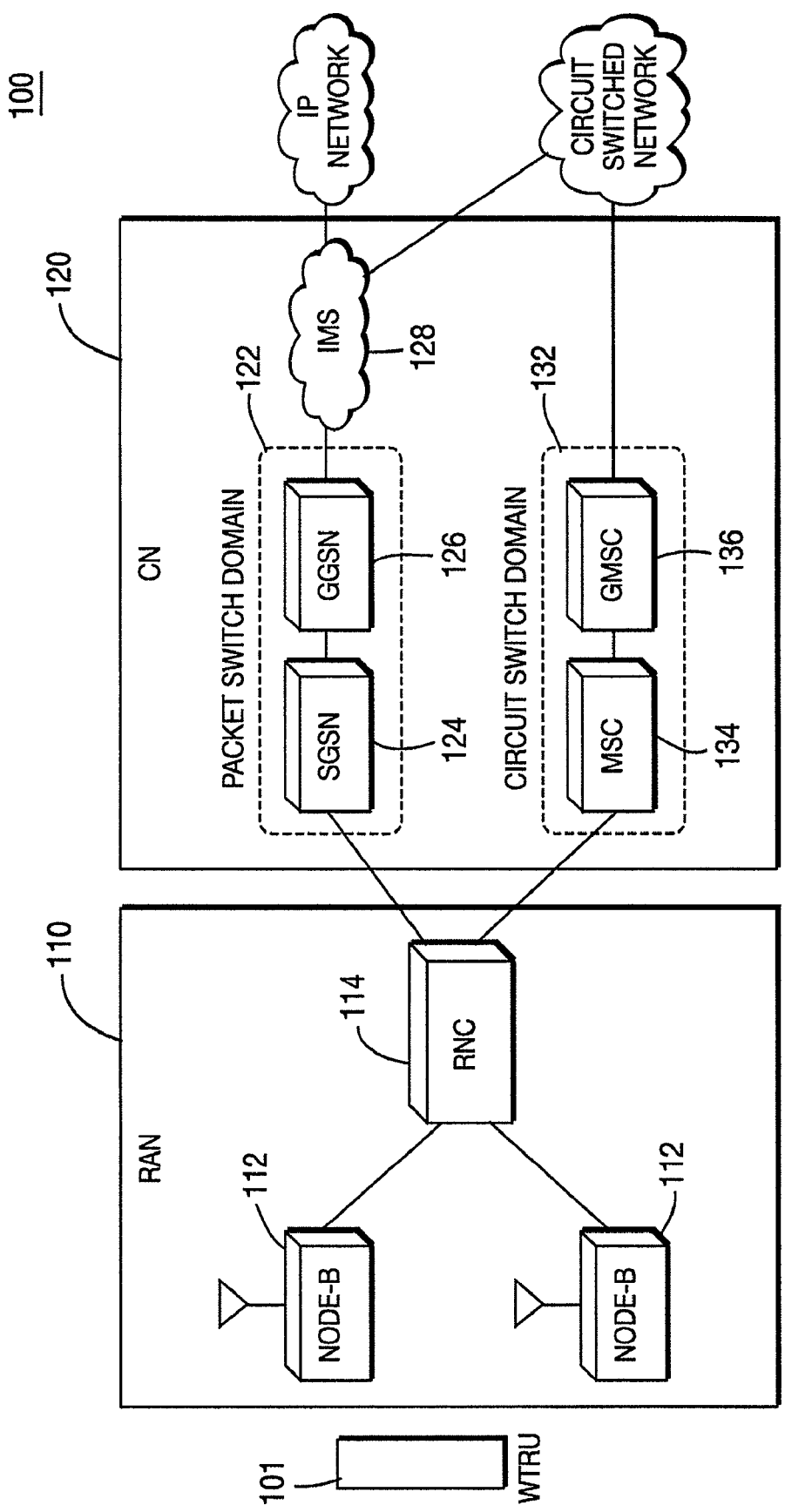
FIG. 1 shows the conventional 3G network.
Figure 2:
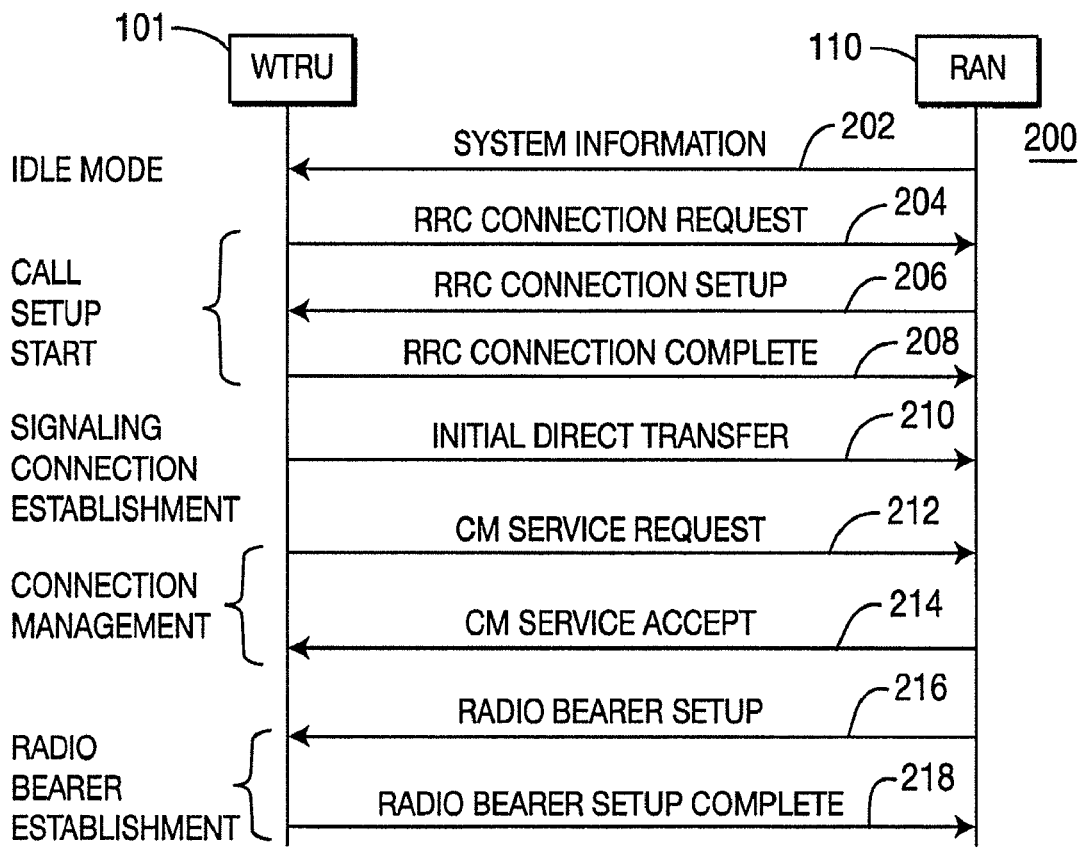
FIG. 2 is a signaling diagram of a conventional call setup procedure.
Figure 3:
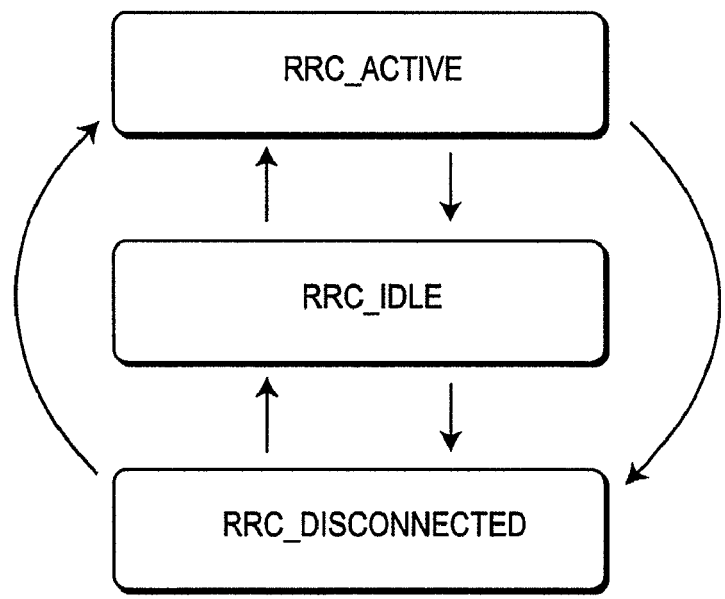
FIG. 3 shows LTE RRC states and transitions between RRC states.

FIG. 3 shows LTE RRC states and transitions between RRC states. Three RRC states, an RRC_connected state, an RRC_idle state and an RRC_disconnected state, are defined. The RRC state may transit between any of the three states.

Figure 4:
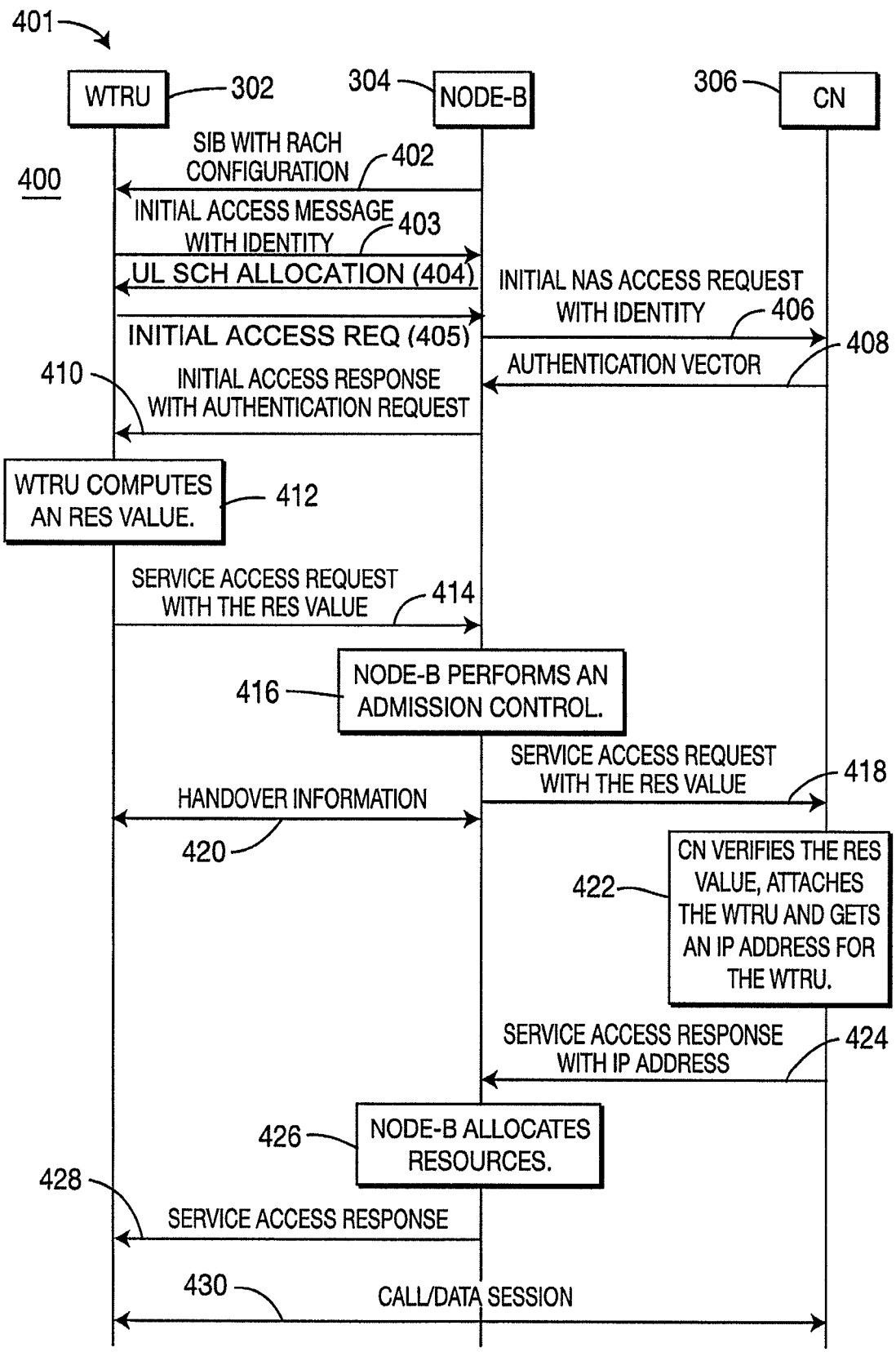
FIG. 4 is a signaling diagram for a call setup process when a WTRU is in a disconnected state in accordance with a first embodiment of the present invention.

FIG. 4 is a signaling diagram for a call setup process 400 when a WTRU is in an RRC_disconnected state, (i.e., the RRC state is transitioning from an RRC_disconnected state to an RRC_connected state), in accordance with a first embodiment of the present invention. The system 401 includes a WTRU 302, a Node-B 304 and a CN 306. The Node-B 304 broadcasts random access channel (RACH) configurations (step 402). The RACH configurations may be included in broadcast system information (SI). The Node-B 304 may also broadcast configurations related to uplink shared channel (UL SCH) and downlink shared channel (DL SCH) operation.

The WTRU 302 is currently in an RRC_disconnected state and is transitioning to an RRC_connected state. The WTRU 302 sends an initial access message via the RACH (step 403). The initial access message includes an identity of the WTRU 302. The Node-B 304 responds with an UL SCH allocation (step 404). The WTRU 302 then transmits an initial access request message to the Node-B 304 on the UL SCH (step 405). The Node-B 304 sends an initial NAS access request message, generated from the WTRU initial access request message, to the CN 306 with an authentication request (step 406).

The CN 306 checks the WTRU identity and allocates, and sends, an authentication vector (AV) for the WTRU 302 to the Node-B 304 (step 408). The AV may comprise a random number (RAND), an authentication token (AUTN), a cipher key (CK) and an integrity key (IK) for the WTRU 302. The CN 306 may choose not to send the CK and IK at this step and may send them later in a service access response message after WTRU verification.

On receiving the authentication vector from the CN 306, the Node-B 304 sends an initial access response message including the RAND and the AUTN for the WTRU 302 (step 410). The initial access response message may include configurations for the UL SCH so that the WTRU 302 may subsequently send a service access request via the UL SCH, and configurations for the DL SCH if the service access response is transmitted via the DL SCH. The allocations of the DL SCH and the UL SCH may take into account the service and associated radio bearer requirements.

The initial access response message may be transmitted via an L1/L2 control channel, DL SCH or L1/L2 control+DL SCH. The channel configurations for the L1/L2 control channel(s) and/or the DL SCH may be pre-configured or signaled via SI. The DL SCH configuration may be pre-configured such that there is a known association between a physical random access channel (PRACH) and the DL SCH. The association may be either known by RRC signaling (e.g., SI) or known by explicit definition in the standard.

On receiving the RAND and AUTN, the WTRU 302 calculates a response (RES) value using a secret key of the WTRU 302 (step 412). The WTRU 302 then sends a service access request message with the RES value to the Node-B 304 (step 414). The service access request message may be transmitted via the UL SCH (that may be allocated by the initial access response message or, alternatively, by SI). The service access request message may include other information, such as the reason for its connection, the desired quality of service (QoS), measurement information, scheduling information, or the like.

Upon reception of the service access request, the Node-B 304 performs an admission control procedure (step 416). The Node-B 304 determines if the Node-B 304 has enough radio resources (based on the parameters of the service access request such as the desired QoS) to service that request. If the Node-B 304 determines that there are sufficient radio resources to service the request, the Node-B 304 sends a service access request message including the identity of the WTRU 302, QoS information and RES value computed by the WTRU 302 to the CN 306 (step 418).

If the Node-B 304 determines that there are not enough radio resources to service the request, the Node-B 304 initiates a handover (step 420). The Node-B 304 looks to nearby cells that can take over the responsibility of providing service to the WTRU 302. Neighboring Node-Bs are preferably directly connected to each other to exchange necessary information to determine which cell and Node-B would be best suited for serving the WTRU 302. After making the decision, the Node-B 304 sends information for the handover to the WTRU 302, the new Node-B and the CN 306, respectively. The Node-B 304 provides the WTRU 302 with channel configurations of the new Node-B, (such as DL SCH, UL SCH, FACH, RACH, or the like), and other information, (for example a new cell specific identity), that the WTRU 302 needs to communicate with the new Node-B. The Node-B 304 also communicates with the new Node-B to inform the new Node-B about the WTRU 302, (or alternatively request the new Node-B to take a responsibility for serving the WTRU 302). The Node-B 304 may also inform the CN 306 about the new Node-B so that the response from the CN 306 is directed to the new Node-B. Alternatively, the new Node-B may be in charge of querying the CN 306 after the new Node-B has assumed responsibility for the WTRU 302 with the RES value, QoS, or the like.

On receiving the service access request along with the RES value, the CN 306 verifies the RES value by comparing the received RES value with an expected RES value and performs an attachment procedure for the WTRU 302 if the received RES value is same to the expected RES value (step 422). The CN 306 then sends a service access response message with an IP address for the WTRU 302 (step 424).

Upon receipt of the service access response message, the Node-B 304 allocates radio resources and sends a service access response message with radio resources allocation information (steps 426, 428). Information regarding header compression and packet data convergence protocol (PDCP) is also added to the service access response message to the WTRU 302 so that the WTRU 302 knows whether to perform header compression or not. The WTRU 302 may optionally send a service access response confirm message to the CN 306 for acknowledgement (not shown). A call/data session then begins (step 430).

A timetable for measurements made by the WTRU 302 may be agreed upon between the WTRU 302 and the Node-B 304. Alternatively, the measurement schedule may be set dynamically.

The authentication procedure may be performed in parallel to the attachment procedure. For example, the CN 306 may assign the WTRU 302 its IP address prior to receiving the RES value from the WTRU 302. Some of the information sent in the service access request, (e.g., the reason for connection), may be sent in the initial access request to enable the CN 306 identify the WTRU 302 better. The entire signaling, (authentication, attachment and IP processing), may be performed in one message. Certain IEs may be sent as separate messages. For example, the RAND and AUTN may be sent to the WTRU 302 separately such that the CN 306 may demand the WTRU 302 to re-authenticate if the CN 306 so chooses without having to go through the entire call setup procedure again.

Figure 5:
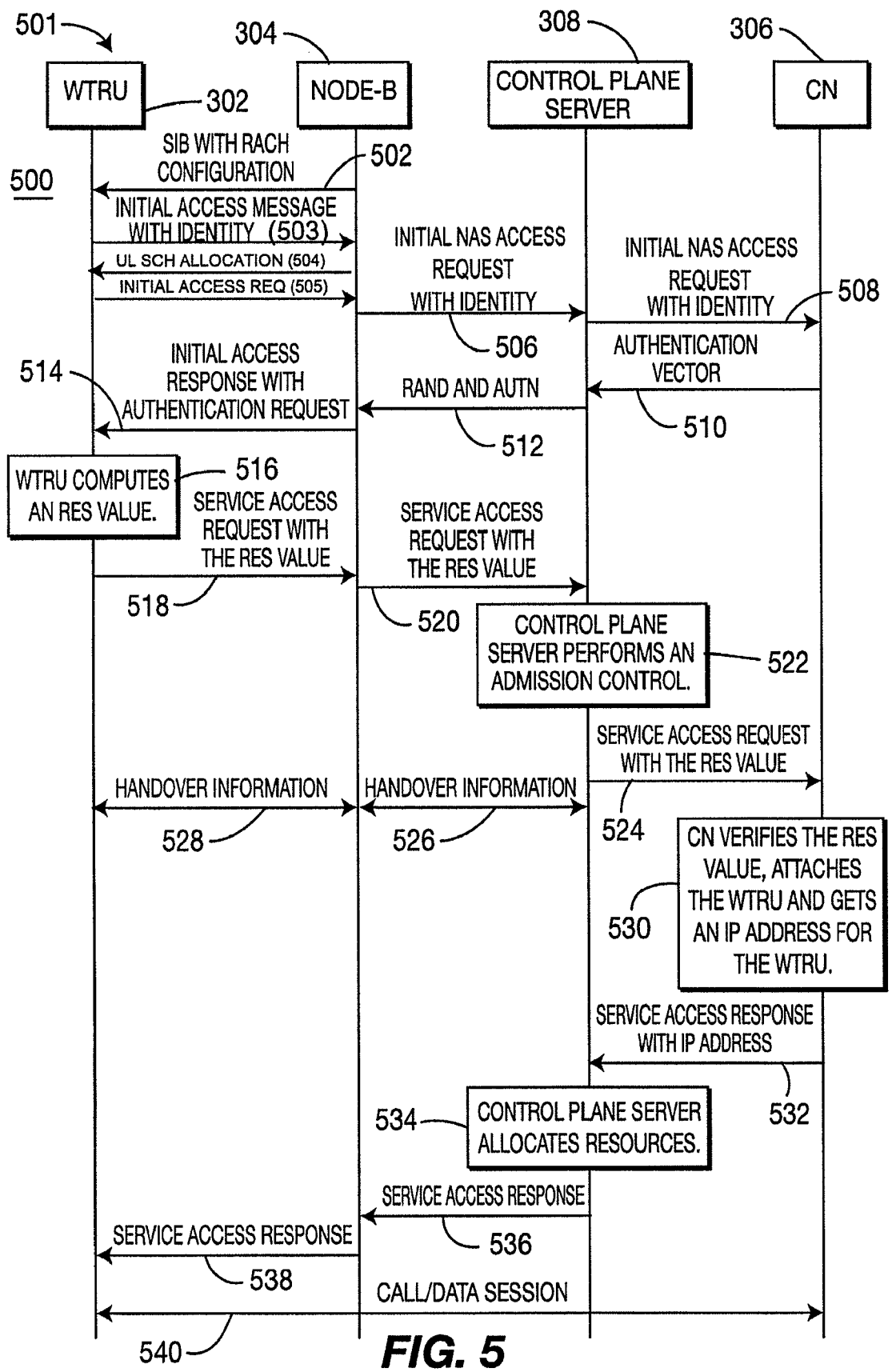
FIG. 5 is a signaling diagram for a call setup process when a WTRU is in a disconnected state in accordance with a second embodiment of the present invention.

FIG. 5 is a signaling diagram for a call setup process 500 when a WTRU is in an RRC_disconnected state, and is transitioning to an RRC_connected state, in accordance with a second embodiment of the present invention. The system 501 includes a WTRU 302, a Node-B 304, a CN 306 and a control plane server 308. The Node-B 304 broadcasts RACH configurations (step 502). The RACH configurations may be included in SI. The Node-B 304 may also broadcast configurations needed for UL SCH and DL SCH operation.

The WTRU 302 is currently in an RRC_disconnected state and is transitioning to an RRC_connected state. The WTRU 302 sends an initial access message via the RACH (step 503). The initial access message includes an identity of the WTRU 302. The Node-B 304 responds with an UL SCH allocation (step 504). The WTRU 302 then transmits an initial access request message to the Node-B 304 on the UL SCH (step 505). The Node-B 304 sends an initial NAS access request message generated from the WTRU initial access request message, with an authentication request to the control plane server 308, which forwards it to the CN 306 (steps 506, 508).

The CN 306 checks the WTRU identity and allocates, and sends, an AV to the Node-B 304 (step 510). The AV may comprise a RAND, an AUTN, a CK and an IK for the WTRU 302. The CN 306 may choose not to send the CK and IK at this step and may send them later in a service access response message after WTRU verification.

On receiving the authentication vector from the CN 306, the control plane server 308 sends the RAND and the AUTN for the WTRU 302 to the Node-B 304 (step 512). The Node-B 304 then sends an initial access response message along with the RAND and the AUTN to the WTRU (step 514). The initial access response message may include configurations for the UL SCH so that the WTRU 302 may subsequently send a service access request via the UL SCH, and configurations for the DL SCH if the service access response is transmitted via the DL SCH.

The initial access request message and the initial access response message may include scheduling information so that resources allocation is optimized. The initial access response message may be transmitted via the DL SCH. The channel configurations for the DL SCH may be signaled by L1/L2 control signaling, pre-configured or may be sent via the SIB. The DL SCH configuration may be pre-configured such that there is a known association between the PRACH and the DL SCH. The association may be either known by RRC signaling (e.g., SI) or known by explicit definition in the standard.

On receiving the RAND and AUTN, the WTRU 302 calculates an RES value using a secret key of the WTRU 302 (step 516). The WTRU 302 then sends a service access request message with the RES value to the Node-B 304 (step 518). The service access request message may be transmitted via the UL SCH (that may be allocated with the initial access response message or, alternatively, by SI). The service access request message may include other information, such as the reason for its connection, the desired quality of service (QoS), measurement information, scheduling information, or the like.

The Node-B 304 forwards the service access request to the control plane server 308 (step 520). Upon reception of the service access request, the control plane server 308 performs an admission control procedure (step 522). The control plane server 308 determines if the Node-B 304 has enough radio resources (based on the parameters of the service access request such as the desired QoS) to service that request. If the control plane server 308 determines that the Node-B 304 has enough radio resources to service the request, the control plane server 308 sends a service access request message including the identity of the WTRU 302, QoS information and RES value computed by the WTRU 302 to the CN 306 (step 524).

If the control plane server 308 determines that the Node-B 304 does not have enough radio resources to service the request, the control plane server 308 initiates a handover (steps 526, 528). The control plane server 308 looks to nearby cells that can take over the responsibility of providing service to the WTRU 302. Node-Bs are connected to the control plane server 308 so that the control plane server 308 collects necessary information to determine which cell and Node-B would be best suited for serving the WTRU 302. After making the decision, the control plane server 308 sends information for the handover to the WTRU 302, the new Node-B and the CN 306, respectively. The control plane server 308 provides the WTRU 302 with channel configurations of the new Node-B, (such as DL SCH, UL SCH, FACH, RACH, or the like), and other information that the WTRU 302 needs to communicate with the new Node-B. The control plane server 308 also communicates with the new Node-B to inform the new Node-B about the WTRU 302, (or alternatively request the new Node-B to take a responsibility for serving the WTRU 302). The control plane server 308 may also inform the CN 306 about the new Node-B so that the response from the CN 306 is directed to the new Node-B. Alternatively, the new Node-B may be in charge of querying the CN 306 after the new Node-B has assumed responsibility for the WTRU 302 with the RES value, QoS, or the like.

On receiving the service access request along with the RES value, the CN 306 verifies the RES value by comparing the received RES value with an expected RES value and performs an attachment procedure for the WTRU 302 if the received RES value is same to the expected RES value (step 530). The CN 306 then sends a service access response message with an IP address to the control plane server 308 (step 532).

Upon receipt of the service access response message, the control plane server 308 allocates radio resources (step 534). The control plane server 308 sends a service access response message with radio resources allocation information to the Node-B 304 (step 536). The Node-B 304 then sends the service access response message along with information regarding header compression and PDCP, measurement scheduling, an RRC state indicator, or the like (step 538). The WTRU 302 may optionally send a service access response confirm message to the CN 306 for acknowledgement (not shown). A call/data session then begins (step 540). A timetable for measurements made by the WTRU 302 may be agreed upon between the WTRU 302 and the Node-B 304, or alternatively, may be set dynamically.

Figure 6:
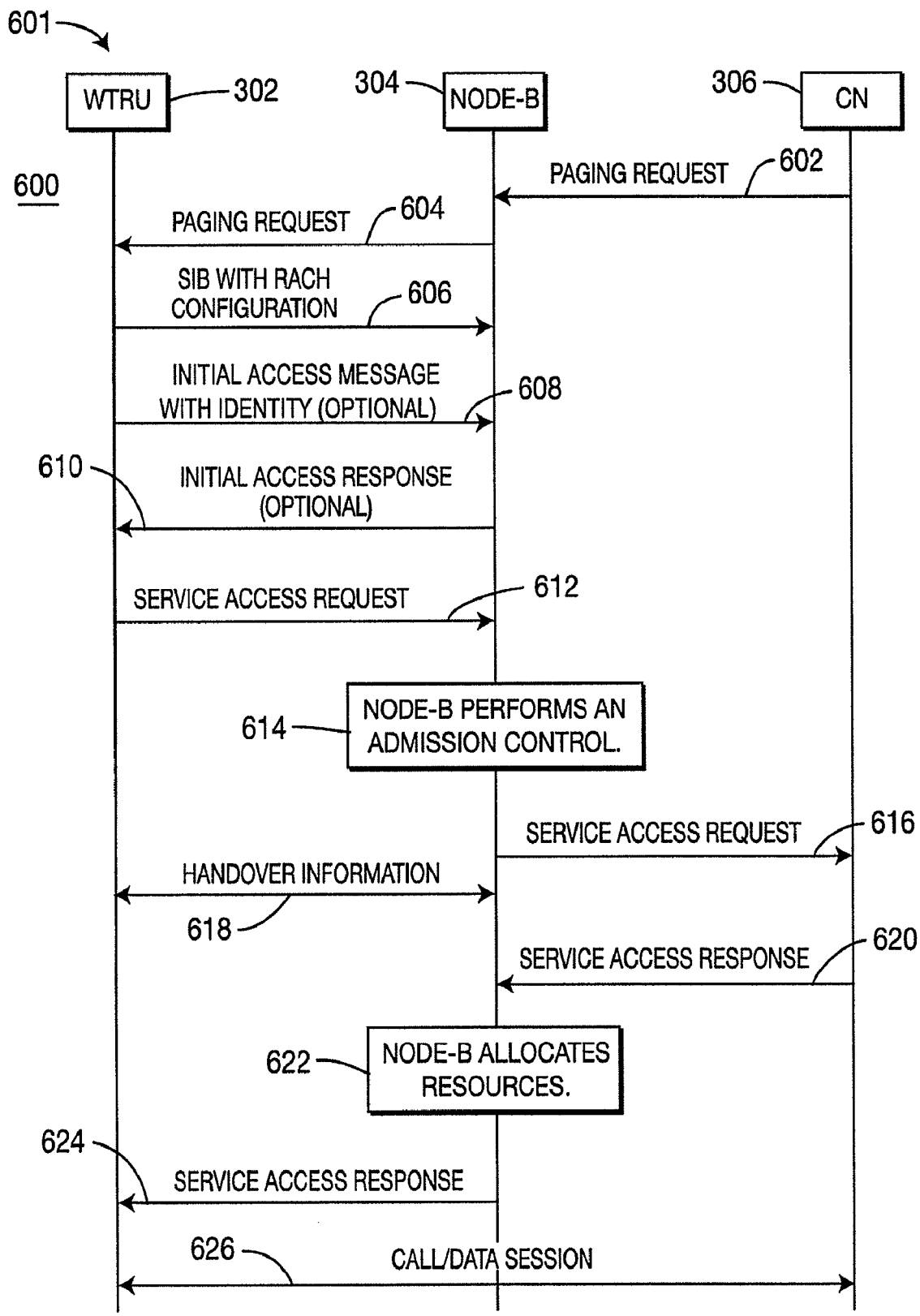
FIG. 6 is a signaling diagram for a call setup process when a WTRU is in an idle state in accordance with a third embodiment of the present invention.

FIG. 6 is a signaling diagram for a call setup process 600 when a WTRU is in an RRC_idle state in accordance with a third embodiment of the present invention. The system 601 includes a WTRU 302, a Node-B 304 and a CN 306. The WTRU 302 is currently in an RRC_idle state and is transitioning to an RRC_connected state. The CN 306 sends a paging message for the WTRU 302 to the Node-B 304, which forwards it to the WTRU 302 (steps 602, 604). Upon receipt of the paging message, the WTRU 302 wakes up from the RRC_idle state. The WTRU may also wake up because of an NAS request within the WTRU.

The Node-B 304 broadcasts RACH configurations (step 606). The RACH configurations may be included in SI. The Node-B 304 may also broadcast configurations for UL SCH and DL SCH operation. Alternatively, the paging request may include channel allocations for the RACH, DL SCH and UL SCH.

When the WTRU 302 wakes up from the RRC_idle state, the WTRU 302 may find itself in a different cell and different universal mobile telecommunication services (UMTS) registration area (URA) that the WTRU 302 was in earlier. The WTRU 302 then may perform a brand new call setup procedure.

The WTRU 302 sends an initial access message with an identity of the WTRU 302 via an RACH (step 608). The Node-B 304 responds with an initial access response message (step 610). The initial access response message may include configurations for the UL SCH so that the WTRU 302 may subsequently send a service access request via the UL SCH, and configurations for the DL SCH if the service access response is transmitted via the DL SCH. The initial access message and the initial access response message may include scheduling information so that resources allocation is optimized. The initial access response message may be transmitted via L1/L2 control channel, the DL SCH, or L1/L2 control+DL SCH. The channel configurations for DL SCH and UL SCH operation may be pre-configured or may be sent via SI. The DL SCH configuration may be pre-configured such that there is a known association between the PRACH and the DL SCH. The association may be either known by RRC signaling (e.g., SI) or known by explicit definition in the standard.

The WTRU 302 then sends a service access request message to the Node-B 304 (step 612). The service access request message may be transmitted via the UL SCH (that may be allocated by the initial access response message or, alternatively, by SI). The service access request message may include other information, such as the reason for its connection, the desired quality of service (QoS), measurement information, scheduling information, or the like.

Upon reception of the service access request, the Node-B 304 performs an admission control procedure (step 614). The Node-B 304 determines if the Node-B 304 has enough radio resources (based on the parameters of the service access request such as the desired QoS) to service that request. If the Node-B 304 determines that there are sufficient radio resources to service the request, the Node-B 304 sends a service access request message including the identity of the WTRU 302 and QoS information to the CN 306 (step 616).

If the Node-B 304 determines that there are not enough radio resources to service the request, the Node-B 304 may initiate a handover (step 618). The Node-B 304 looks to nearby cells that can take over the responsibility of providing service to the WTRU 302. Neighboring Node-Bs are preferably directly connected to each other to exchange necessary information to determine which cell and Node-B would be best suited for serving the WTRU 302. After making the decision, the Node-B 304 sends information for the handover to the WTRU 302, the new Node-B and the CN 306, respectively. The Node-B 304 provides the WTRU 302 with channel configurations of the new Node-B, (such as DL SCH, UL SCH, RACH, or the like), and other information that the WTRU 302 needs to communicate with the new Node-B. The Node-B 304 also communicates with the new Node-B to inform the new Node-B about the WTRU 302, (or alternatively request the new Node-B to take a responsibility for serving the WTRU 302). The Node-B 304 may also inform the CN 306 about the new Node-B so that the response from the CN 306 is directed to the new Node-B. Alternatively, the new Node-B may be in charge of querying the CN 306 after the new Node-B has assumed responsibility for the WTRU 302 with the RES value, QoS, or the like.

On receiving the service access request, the CN 306 sends a service access response message with an IP address for the WTRU 302 (step 620). Upon receipt of the service access response message, the Node-B 304 allocates radio resources (step 622) and sends a service access response message with radio resources allocation information (step 624). Information regarding header compression and packet data convergence protocol (PDCP) is also added to the service access response message to the WTRU 302 so that the WTRU 302 knows whether to perform header compression or not. The WTRU 302 may optionally send a service access response confirm message to the CN 306 for acknowledgement (not shown). A call/data session then begins (step 626).

Alternatively, the network may have a policy for re-authenticating the WTRU 302 when the WTRU 302 transitions from an RRC_idle state to an RRC_connected state. In such case, the call setup procedure 600 would be same to the call setup procedure 400.

Alternatively, the CN 306 may indicate to the WTRU 302 to use the call setup procedure 400. This indication may be provided in the paging message. Alternatively, the initial access response message may indicate to the WTRU 302 to re-authenticate with an RAND and an AUTN provided in the initial access response message, or the service access response message may include the RAND and the AUTN and may indicate to the WTRU 302 that the WTRU 302 needs to re-authenticate.

When the WTRU wakes up from the RRC_idle state, the WTRU 302 may find itself in the same cell and same URA that the WTRU 302 was in earlier. In such case, the WTRU 302 may skip step 606 and may proceed directly to step 610. This assumes that certain portions of the shared channels are permanently assigned for this purpose to all WTRUs in the cell. For optimization, this permanent allocation may be performed intelligently so that if no one is using the portion of shared channel for service request, active WTRUs may use it instead. In the event that there is no permanent allocation, the WTRU 302 has to perform the call-setup procedure 600 starting from step 606. The WTRU 302 may or may not need to re-authenticate as stated above.

Figure 7:
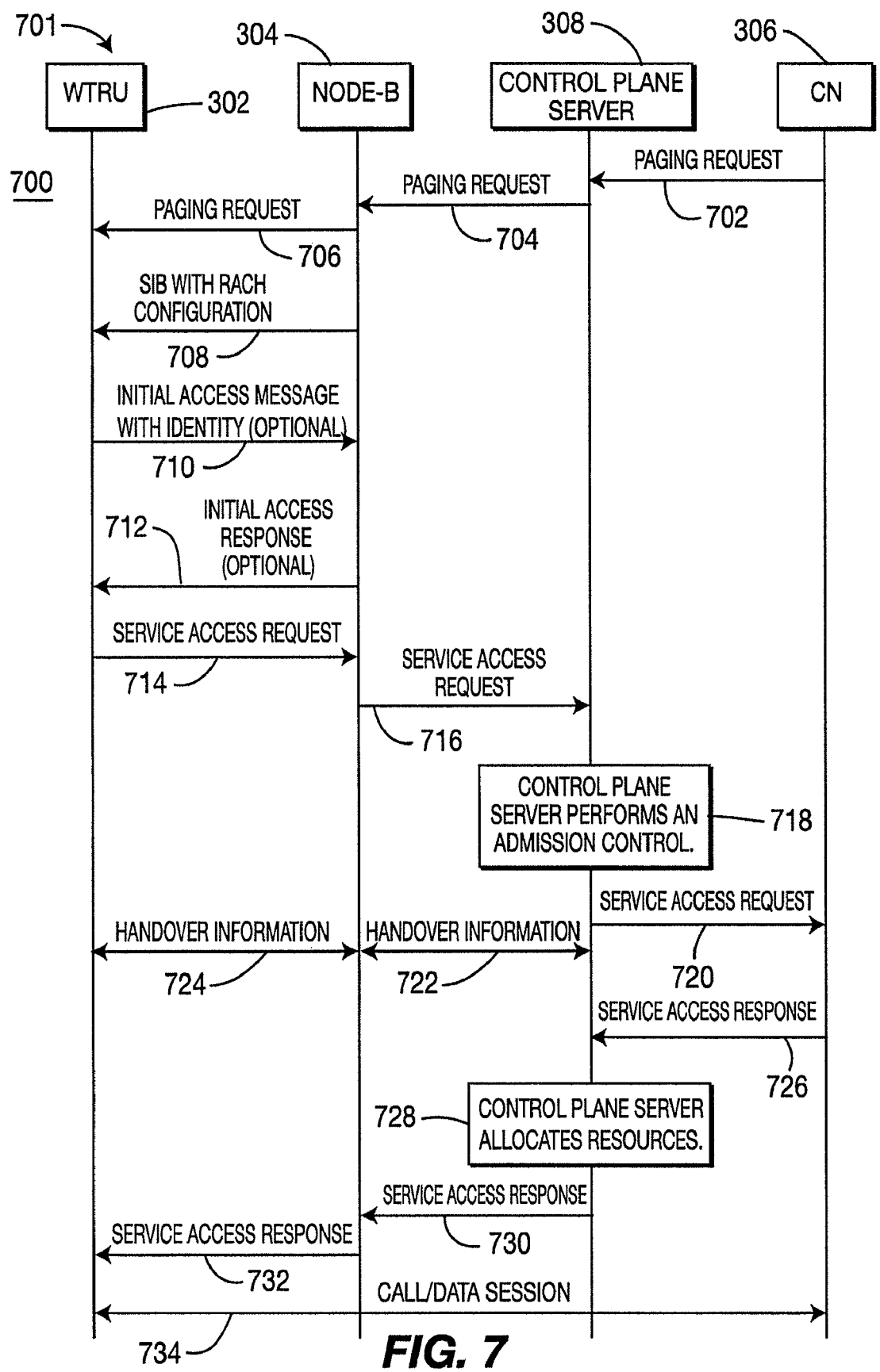
FIG. 7 is a signaling diagram for a call setup process when a WTRU is in an idle state in accordance with a fourth embodiment of the present invention.

FIG. 7 is a signaling diagram for a call setup process 700 when a WTRU is in an RRC_idle state in accordance with a fourth embodiment of the present invention. The system 701 includes a WTRU 302, a Node-B 304, a CN 306 and a control plane server 308. The WTRU 302 is currently in an RRC_idle state and is transitioning to an RRC_connected state. The CN 306 sends a paging message for the WTRU 302 to the control plane server 308, which forwards it to the Node-B 304, which in turn forwards it to the WTRU 302 (steps 702, 704, 706).

Upon receipt of the paging message, the WTRU 302 wakes up from the RRC_idle state. The WTRU may wake up because of an NAS request within the WTRU.

The Node-B 304 broadcasts RACH configurations (step 708). The RACH configurations may be included in an SIB. The Node-B 304 may also broadcast configurations for UL SCH and DL SCH operation. Alternatively, the paging request may include channel allocations for the RACH, DL SCH and UL SCH.

When the WTRU wakes up from the RRC_idle state, the WTRU 302 may find itself in a different cell and different URA that the WTRU 302 was in earlier. The WTRU 302 then may perform a brand new call setup procedure.

The WTRU 302 sends an initial access message with an identity of the WTRU 3020 via the RACH (step 710). The Node-B 304 then sends an initial access response message to the WTRU (step 712). The initial access response message may include configurations for the UL SCH so that the WTRU 302 may subsequently send a service access request via the UL SCH, and configurations for the DSCH if the service access response is transmitted via the DSCH.

The initial access message and the initial access response message may include scheduling information so that resources allocation is optimized. The initial access response message may be transmitted via L1/L2 control, the DL SCH, or L1/L2 control+DL SCH. The channel configurations for the DL SCH may be pre-configured or may be sent via SI. The DL SCH configuration may be pre-configured such that there is a known association between the physical random access channel (PRACH) and the DL SCH. The association may be either known by RRC signaling (e.g., SI) or known by explicate definition in the standard.

The WTRU 302 then sends a service access request message to the Node-B 304 (step 714). The service access request message may be transmitted via the UL SCH (that may be allocated by the initial access response message or, alternatively, by the SIB). The service access request message may include other information, such as the reason for its connection, the desired quality of service (QoS), measurement information, scheduling information, or the like.

The Node-B 304 forwards the service access request to the control plane server 308 (step 716). Upon reception of the service access request, the control plane server 308 performs an admission control procedure (step 718). The control plane server 308 determines if there are enough radio resources (based on the parameters of the service access request such as the desired QoS) to service that request. If the control plane server 308 determines that there are enough radio resources to service the request, the control plane server 308 sends a service access request message including the identity of the WTRU 302 and QoS information to the CN 306 (step 720).

If the control plane server 308 determines that there are not enough radio resources to service the request, the control plane server 308 initiates a handover (steps 722, 724). The control plane server 308 looks to nearby cells that can take over the responsibility of providing service to the WTRU 302. Node-Bs are connected to the control plane server 308 so that the control plane server 308 collects necessary information to determine which cell and Node-B would be best suited for serving the WTRU 302. After making the decision, the control plane server 308 sends information for the handover to the WTRU 302, the new Node-B and the CN 306, respectively. The control plane server 308 provides the WTRU 302 with channel configurations of the new Node-B, (such as DL SCH, UL SCH, RACH, or the like), and other information that the WTRU 302 needs to communicate with the new Node-B. The control plane server 308 also communicates with the new Node-B to inform the new Node-B about the WTRU 302, (or alternatively request the new Node-B to take a responsibility for serving the WTRU 302). The control plane server 308 may also inform the CN 306 about the new Node-B so that the response from the CN 306 is directed to the new Node-B. Alternatively, the new Node-B may be in charge of querying the CN 306 after the new Node-B has assumed responsibility for the WTRU 302 with the RES value, QoS, or the like.

On receiving the service access request, the CN 306 sends a service access response message with an IP address to the control plane server 308 (step 726). Upon receipt of the service access response message, the control plane server 308 allocates radio resources (step 728). The control plane server 308 sends a service access response message with radio resources allocation information to the Node-B 304 (step 730). The Node-B 304 then sends the service access response message to the WTRU 302 along with information regarding header compression and PDCP, measurement scheduling, an RRC state indicator, or the like (step 732). The WTRU 302 may optionally send a service access response confirm message to the CN 306 for acknowledgement (not shown). A call/data session then begins (step 734).

Alternatively, the network may have a policy for re-authenticating the WTRU 302 when the WTRU 302 transitions from an RRC_idle state to an RRC_active state. In such case, the call setup procedure 700 would be same as the call setup procedure 500.

Alternatively, the CN 306 may indicate to the WTRU 302 to use the call setup procedure 500. This indication may be provided in the paging message. Alternatively, the initial access response message may indicate to the WTRU 302 to re-authenticate with an RAND and an AUTN provided in the initial access response message, or the service access response message may include the RAND and the AUTN and may indicate to the WTRU 302 that the WTRU 302 needs to re-authenticate.

When the WTRU wakes up from the RRC_idle state, the WTRU 302 may find itself in the same cell and same URA that the WTRU 302 was in earlier. In such case, the WTRU 302 may skip the step 710 and may proceed directly to step 714. This assumes that certain portions of the shared channels are permanently assigned for this purpose to all WTRUs in the cell. For optimization, this permanent allocation may be performed intelligently so that if no one is using the portion of shared channel for service request, active WTRUs may use it instead. In the event that there is no permanent allocation, the WTRU 302 has to perform the call-setup procedure 700 starting from step 710. The WTRU 302 may or may not need to re-authenticate as stated above.

The messages between the Node-B 304 and the control plane server 308 may be RRC messages if RRC is terminated in the control plane server 308 or Iub messages if RRC is terminated in the Node-B 304.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) configured to interact with a core network (CN) via a Node-B to setup a call, comprising:

a transmitter configured to transmit an initial access request message including an identity of the WTRU, wherein the initial access request message is sent to the CN via the Node-B, a receiver configured to receive an initial access response message received by the WTRU in response to the initial access request, the initial access response message including an authentication request, the transmitter further configured to transmit a service access request message including an authentication response responsive to the authentication request, wherein the service access request is sent to the CN via the Node-B, the receiver further configured to receive a service access response containing an IP address received by the WTRU, wherein on receipt of the service access response, the WTRU call setup is complete.

2. The WTRU of claim 1 wherein the WTRU sends the initial access request message via a random access channel (RACH).

3. The WTRU of claim 2 wherein configuration for the RACH is included in system information received by the WTRU.

4. The WTRU of claim 1 wherein the initial access response message includes configuration for an uplink shared channel (UL SCH), wherein the WTRU sends the service access request message via the UL SCH.

5. The WTRU of claim 1 wherein the service access request message includes at least one of a reason for connection, a desired quality of service (QoS) and measurement information.

6. The WTRU of claim 1 wherein the initial access request includes at least one of a reason for connection, a desired quality of service (QoS) and measurement information.

7. The WTRU of claim 1 wherein the WTRU receives the initial access response message via one of a forward access channel (FACH) and a downlink shared channel (DL SCH).

8. The WTRU of claim 7 wherein configuration for the DL SCH for transmission of the initial access response message is preconfigured.

9. The WTRU of claim 1, wherein the WTRU and the Node-B agree upon a time table for measurements after the call setup.

10. The WTRU of claim 1 wherein the WTRU is in a radio resource control (RRC) disconnected state when sending the initial access request.

11. The WTRU of claim 1 wherein the WTRU is in a radio resource control (RRC) idle state when sending the initial access request.

12. A method for setting up a wireless call from a wireless transmit/receive unit (WTRU), the method comprising:

a WTRU sending an initial access request message including an identity of the WTRU to a core network (CN) via a Node-B and a control plane server;

the WTRU receiving an initial access response message from the Node-B, the initial access response message including the authentication request;

the WTRU sending a service access request message to the Node-B, the service access request message including an authentication response;

the CN performing an attachment procedure for the WTRU if the authentication response is same to an expected response; and a control plane server allocating radio resources to the WTRU.

13. The method of claim 12 wherein the WTRU sends the initial access request message via a random access channel (RACH).

14. The method of claim 13 wherein configuration for the RACH is included in system information broadcast by the Node-B.

15. The method of claim 12 wherein the initial access response message includes configuration for an uplink shared channel (UL SCH), whereby the WTRU sends the service access request message via the UL SCH.

16. The method of claim 12 wherein the service access request message includes at least one of a reason for connection, a desired quality of service (QoS) and measurement information.

17. The method of claim 12 wherein the initial access request includes at least one of a reason for connection, a desired quality of service (QoS) and measurement information.

18. The method of claim 12 wherein the Node-B sends the initial access response via one of a forward access channel (FACH) and a downlink shared channel (DL SCH).

19. The method of claim 18 wherein configuration for the DL SCH for transmission of the initial access response is preconfigured.

20. The method of claim 12 further comprising:

if it is decided not to accept the WTRU, the control plane server selecting an alternate Node-B among a plurality of neighboring Node-Bs for a handover; and the control plane server informing the alternate Node-B, the WTRU and the CN about the handover.

21. The method of claim 12 further comprising:

the WTRU and the Node-B agreeing upon a time table for measurements after the call setup.

22. The method of claim 12 wherein the WTRU is in a radio resource control (RRC) disconnected state when sending the initial access request.

23. The method of claim 12 wherein the WTRU is in a radio resource control (RRC) idle state when sending the initial access request.

* * * * *